(12) United States Patent
Zimmermann

(10) Patent No.: US 7,905,004 B2
(45) Date of Patent: Mar. 15, 2011

(54) SMALL HANDLE ASSEMBLY TOOL

(76) Inventor: Roger Zimmermann, Hatley, WI (US)

( * ) Notice: Subject to any disclaimer, the term of this patent is extended or adjusted under 35 U.S.C. 154(b) by 880 days.

(21) Appl. No.: 11/840,201

(22) Filed: Aug. 16, 2007

(65) Prior Publication Data

US 2008/0040909 A1      Feb. 21, 2008

Related U.S. Application Data

(60) Provisional application No. 60/822,578, filed on Aug. 16, 2006.

(51) Int. Cl.
*B23P 19/02*      (2006.01)
*B23Q 3/12*       (2006.01)

(52) U.S. Cl. .......................................... 29/525; 269/287

(58) Field of Classification Search .............. 29/525, 29/464, 466, 450, 445, 451, 453, 467, 468, 29/469, 407.09, 407.1, 50, 56.5, 56.6, 33 T, 721, 759, 760, 787, 808, 255, 270, 271, 278, 280, 281.1, 281.4, 281.5, 283; 269/287
See application file for complete search history.

(56) References Cited

U.S. PATENT DOCUMENTS

| | | | | |
|---|---|---|---|---|
| 4,086,929 A | * | 5/1978 | Focht | 134/56 D |
| 4,443,898 A | * | 4/1984 | Aguero | 4/313 |
| 4,841,581 A | * | 6/1989 | Russell | 4/400 |
| 5,806,164 A | * | 9/1998 | Wilks | 29/426.5 |

* cited by examiner

*Primary Examiner* — John C Hong
(74) *Attorney, Agent, or Firm* — Lane Patents LLC

(57) ABSTRACT

A pen assembly tool used to press-fit mating parts of a pen kit upon a lathe is disclosed. Use of the pen assembly tool allows wood turners to accurately align, assemble and press-fit mating parts of a pen kit or similar array of objects upon the same lathe used to create certain mating parts of the pen, such as a combined pen-tube and turning blank.

13 Claims, 6 Drawing Sheets

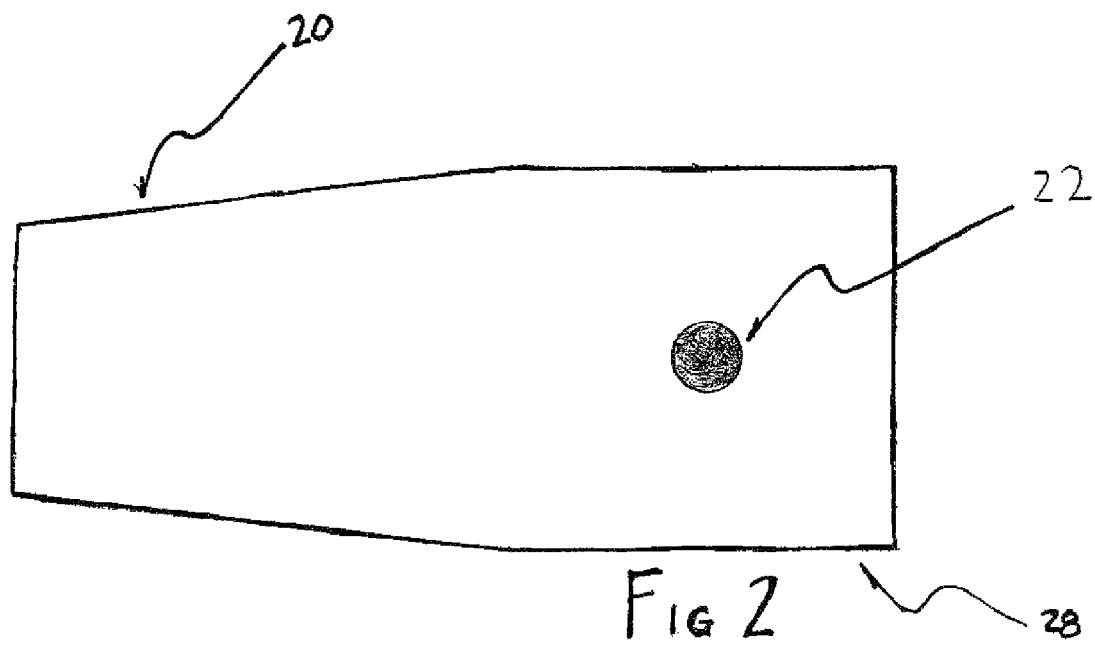
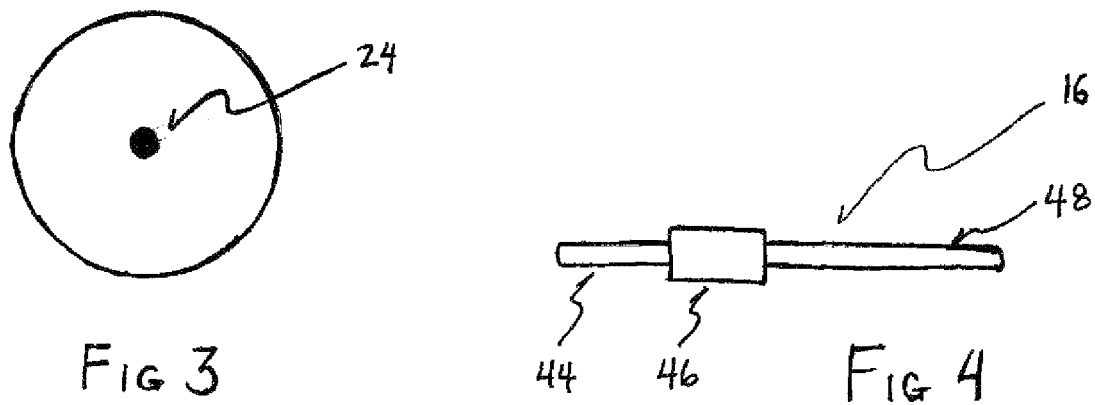

SMALL HANDLE ASSEMBLY TOOL

CROSS-REFERENCE TO RELATED APPLICATIONS

The present application is a continuation-in-part application of U.S. provisional patent application Ser. No. 60/822,578; filed Aug. 16, 2006, for SMALL HANDLE PRODUCTION METHOD AND APPARATUS, included by reference herein and for which benefit of the priority date is hereby claimed.

FIELD OF THE INVENTION

The present invention relates to press-fitting the mating parts of a functional handle kit, such as a pen, used in conjunction with a means for compression fitting such as a lathe comprised of, a mounting head and a compressing head, which can be interchangeably fixed to the tailstock or headstock of a lathe. The tool contains components and a method to ensure accurate alignment and assembly of the mating parts of a functional handle kit and allow the user very accurate control of the press fitting process.

BACKGROUND OF THE INVENTION

Many people turn to woodworking these days for enjoyment, to relieve stress, and the fulfillment of making a unique and interesting expression of their creativity. One area of woodworking is in making small functional handles, such as for pens. For example, a pen is often formed by combining a pen nib, lower and upper barrels, a pen transmission and a pen cap or pen clip with a stylistically turned pen blank. Small functional handle kits are provided from suppliers but require the craftsman to combine the mating parts using a compression device, such as an arbor press or other such means.

The creation of functional handles comes from blanks, which are often intricate and with decorative coverings, and are often machined or turned on a lathe. They are often made of wood or other generally workable non-wood material which contains an interesting visual pattern. The blank is often worked to form the handle portion of an item. The combining of a handle portion, which is often hollow, with the mating parts of a handle kit forms a functional handle for pens, laser pointers, whistles, mechanical pencils, magnifying glasses, small bottles and the like.

The craftsman prepares the blank by drilling or boring a hole through the blank, then shaping or turning the blank with the inserted pen-tube on a lathe or other apparatus to define the outward shape or appearance of the blank in an artful way. Usually a small resilient tube, called a pen-tube, is successfully secured into a handle portion. The pen tube forms a receiving means for the mating parts contained in a pen assembly kit. Mating parts can include a wide combination of items that are typically press-fitted together. For example, a pen kit can include a pen nib which is pressed into a pen-tube within a handle portion, or a pen-clip and a pen-tube combined with a handle portion. The mating parts are not restricted only to those parts that make a pen, but may contain parts used to press-fit any useful object to the handle.

Pen-tube is a term generally used to mean a tube, usually metallic, which is inserted and glued into the blank. Most pen assembly kits utilize a 7 mm pen-tube size, but the present invention can accommodate different barrel diameters by using different size bushings on the mandrel. The pen-tubes are also used to provide a means for attaching the blank to another object such as to an end of a magnifying glass, or to house a mechanism for a pen or mechanical pencil or other such item. It is not restricted only to making a pen, but may be any useful object requiring a substantially hollow handle.

Various methods for assembling the functional handle are available; for example using a percussive tool, such as a mallet, to drive the mating parts together. This method can be quite crude, resulting in misadjusted and broken parts.

Another method is to use a stand alone arbor press. Arbor presses for this purpose are commercially available. One shortcoming is that they do not function integrally with a lathe and must be used in a separate operation. This requires yet another tool to further crowd the craftsman's already crowded work space. Arbor presses are based on a lever arm that can lack the sensitive control required during the press-fitting process with motion that is not always linear or aligned for compression. The clamps and arms of the arbor press often become twisted, causing inconsistent compression pressure, resulting in a poorly press-fitted handle.

The current methodology features a pen assembly tool which can be used in conjunction with the lathe tailstock receiver and hand-wheel to press the various mating parts together, thus eliminating the need for a specialized tool such as the arbor press. This handle assembly tool aligns all the mating parts along the centerline of the functional handle to ensure accurate alignment and assembly.

Furthermore, most lathe tailstock quills are operated on a screw principle which is much more finely controlled than a simple press. Therefore the pen assembly tool allows for very accurate control of the press fitting process. Another advantage being that assembly can be done with need for a separate press by using the same lathe that is used to form the turning blank.

The pen assembly tool is comprised of a mounting head and a compressing head. Which are interchangeably fixable to the tailstock or headstock of the lathe. Although preferably used in conjunction, those familiar with the art will easily recognize the functionality of the pen assembly tool in using only one of the components upon a headstock or tailstock, or used in combination with other assembly means.

It is therefore an advantage of the invention to function integrally with a lathe;

It is another advantage of the invention to allow flexibility of use on a lathe, whereupon either the mounting head or compressing head can be attached to either the headstock or tailstock of the lathe;

It is another advantage of the invention to use the functionality of the lathe tailstock or headstock to press fit mating parts together;

It is another advantage of the invention to align all mating parts to ensure accurate alignment and assembly;

It is another advantage of the invention to allow the user very accurate control of the press fitting process;

It is another advantage of the invention that pen tool assembly can be accomplished using the same lathe used to create the individual mating parts;

It is another advantage of the invention to incorporate a plurality of O-rings along the coupling end to ease the insertion and removal of the mounting head and compressing head upon the lathe, without use of external tools.

It is another advantage of the invention that the mounting head and compressing head both accommodate a shoulder, which enhances alignment along the center axis of the lathe during press-fitting.

SUMMARY OF THE INVENTION

Brief Description of the Drawings

A complete understanding of the present invention may be obtained by reference to the accompanying drawings, when considered in conjunction with the subsequent, detailed description, in which:

FIG. 2 is a side view of the mounting head of the pen assembly tool;

FIG. 3 is a front view of the mounting head of the pen assembly tool;

FIG. 4 is a side view of the alignment rod and bushing;

DESCRIPTION OF THE PREFERRED EMBODIMENT

Figure 1:
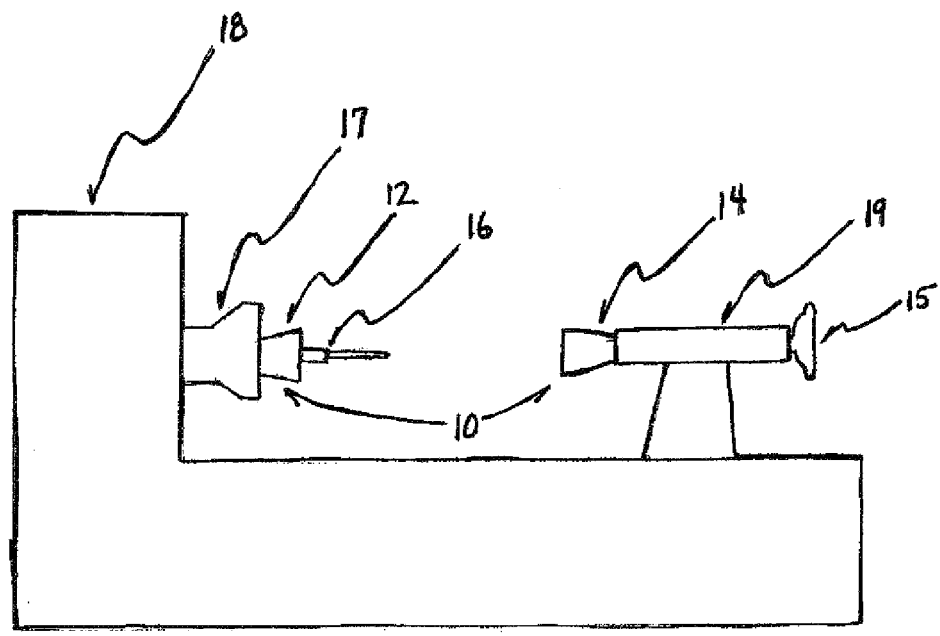
FIG. 1 is a side schematic view of the pen assembly tool fixed to a lathe.

FIG. 1 shows the pen assembly tool (10) fixed to a lathe (18). The pen assembly tool is a system with two components, the mounting head (12) and the compressing head (14), both fixable to either the headstock (17) or tailstock (19) of a lathe (18). The alignment rod and bushing (16) are inserted into the mounting head (12).

Figure 7:
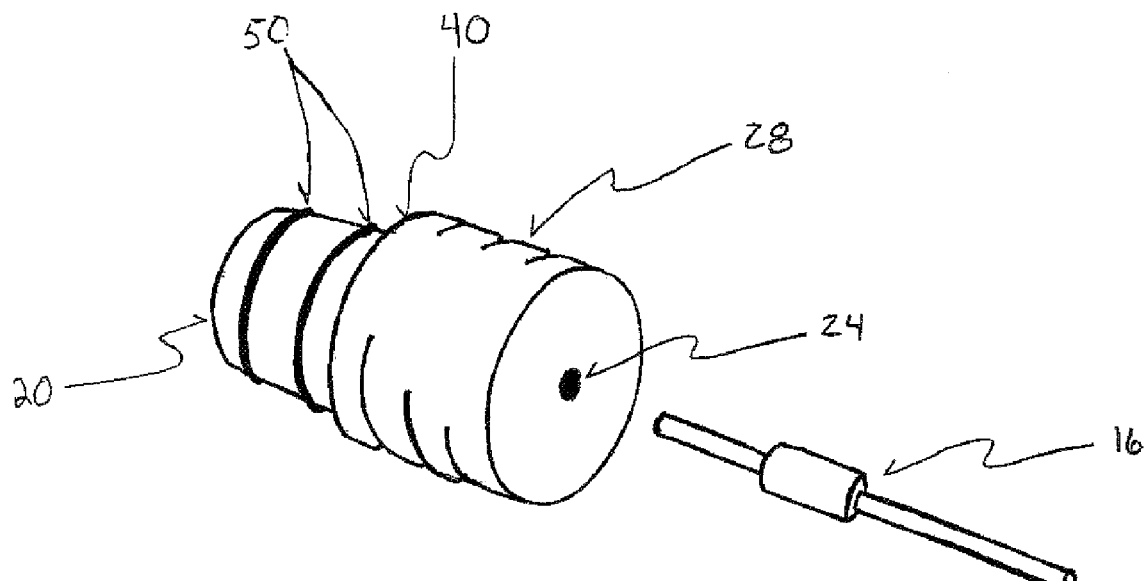
FIG. 7 is an exploded view of an alternate embodiment of the mounting head of the pen assembly tool with alignment rod and bushing.

FIG. 2 and FIG. 7 show several embodiments of the mounting head (12) of the pen assembly tool (10). The coupling end (20) for the mounting head (12) can be affixed to either the tailstock (19) or headstock (17) of a lathe, opposite of a compressing head (14). An alignment rod and bushing (16) may be attached to support and align a functional handle transmission to allow accurate fit up along the mounting axis. The alignment rod and bushing (16) is provided to match the inside diameter of the insertion tube for accurate centering of the tube on the axis centerline of the lathe spindle. In one embodiment a drill hole (22) in the base (28) of the mounting head (12) can be added to allow insertion of a rod or other tool to facilitate the removal of the mounting head (12) from either the headstock (17) or tailstock (19) of the lathe. The base (28) of the mounting head also provides mounting for the alignment rod and bushing (16).

FIG. 3 shows the mounting head (12) of the pen assembly tool (10). A drill hole (24) can be added to insert the alignment head and bushing (16).

FIG. 4 is a side view of the alignment rod and bushing (16). The insertion guide (44) of the alignment rod is inserted into the mounting head (12). The drill hole (24) is of smaller diameter than the bushing (46), allowing the alignment rod to attach to the mounting head (12). The diameter of the bushing (46) is typically designed to flush fit the inside of a pen barrel (56). The transmission guide (48) of the alignment rod is approximately equal in diameter to the outer diameter of a pen-tube. The alignment rod and bushing (16) also provides a buttress for inserting a pen transmission.

Figure 5:
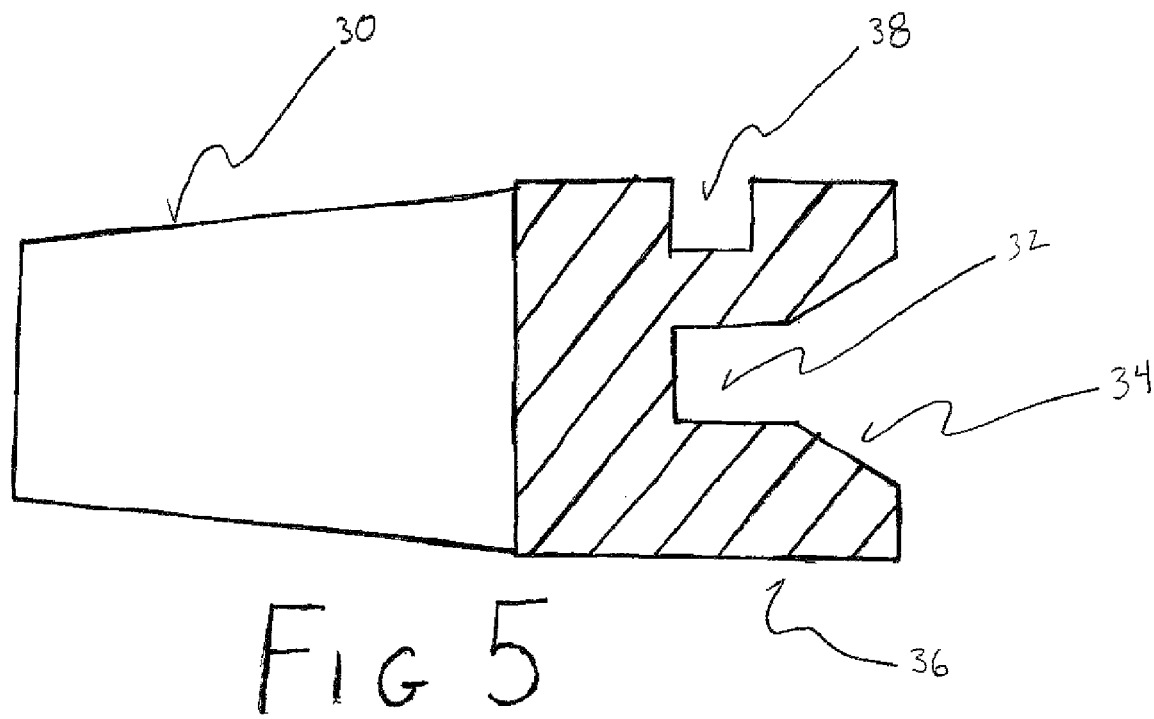
FIG. 5 is a side view of the compressing head of the pen assembly tool showing a cross section of the base.
Figure 8:
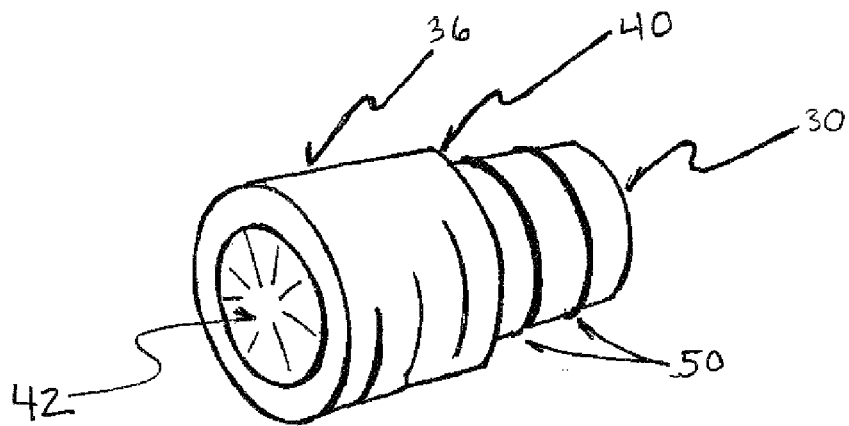
FIG. 8 shows a perspective view of an alternate embodiment of the compressing head of the pen assembly tool.

FIG. 5 and FIG. 8 each show the compressing head (14) of the pen assembly tool (10). The coupling end (30) for the compressing head (14) can be affixed to either the tailstock (19) or headstock (17) of a lathe, opposite of the mounting head (12). A centering means, such as a center bevel (34) is provided within the base (36) of the compressing head (14), to accommodate the centering of a pen nib along the centerline axis of the lathe. A clearance hole (32) is provided past the center bevel (34), within the base (36) of the compressing head (14). The drill hole (38) in the base (36) of the compressing head (14) allows insertion of a rod to facilitate the removal of the compressing head (14) from either the headstock (17) or tailstock (19) of a lathe. The base (36) of the compressing head (14) also accommodates the drilling and machining of the clearance hole (32) and the beveled alignment surface.

Figure 6:
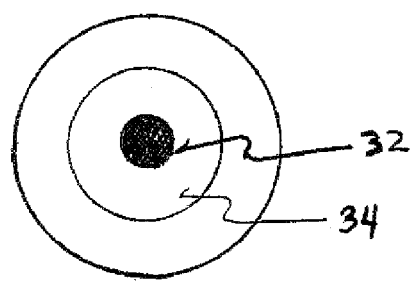
FIG. 6 is a front view of the compressing head of the pen assembly tool.

FIG. 6 is a front view of the compressing head (14) of the pen assembly tool (10). A clearance hole (32) is provided past the center bevel (34), within the base (36) of the compressing head (14) to accommodate the centering of a pen nib (54) along the centerline axis of a lathe. The center bevel (34) provides a means for self centering of mating parts as any misalignment will move along the beveled surface to the centerpoint.

FIG. 7 represents a preferred embodiment of the mounting head (12) of the pen assembly tool (10). The mounting head (12) can be fabricated from any suitable material such as wood, plastic, or in particular a self lubricating, workable plastic such as Acetal based Delrin®. It can be formed as a single piece whereby the outermost radius of the cylindrical coupling end (20) is less than, and in this particular embodiment is roughly sixty percent of, the diameter of the base of the mounting head (12), forming a substantially squared shoulder (40) between the coupling end (20) and the base of the mounting head (28). The shoulder (40) enhances alignment along the center axis of the lathe during press-fitting. A plurality of o-rings (50) are provided along the coupling end (20) to ease the insertion and removal of the mounting head (12) upon the lathe, without use of external tools, obviating the need for a drill hole (22). Using a plurality of o-rings (50) provides multiple contact points which eliminates fulcra and further provides stabilization along the cone of the Morse Taper. The use of o-rings (50) further provides an anti-slip interface between the metal of the receiving piece of the lathe and the normally highly lubricated Delrin®. This allows the coupling end (20) and (30) to remain engaged without slipping out, and yet be able to be easily removed by hand without the use of rods or other tools. The base of the mounting head (28) can be shaped, scored, knurled, or roughened to provide a gripping means to provide ease of handling, removal and insertion. In the shown embodiment, a ribbed form of the component base is shown, with three ridges along its cylindrical body to facilitate gripping.

FIG. 8 represents the preferred embodiment of the compressing head (14) of the pen assembly tool (10). The compressing head (14) can be fabricated as a single piece whereby the outermost radius of the cylindrical coupling end (30) is less than, and in this particular embodiment is roughly sixty percent of, the diameter of the base of the compressing head (36), forming a substantially squared shoulder (40) between the coupling end (30) and the base of the compressing head (36). The shoulder (40) enhances alignment along the center axis of the lathe during press-fitting. A plurality of o-rings (50) are provided along the coupling end (20) to ease the insertion and removal of the mounting head (12) upon the lathe, without use of external tools, obviating the need of a drill hole (38). A bevel depression (42) replaces a center bevel (34) and clearance hole (32), because of the advantages of the shoulder (40) herein described. At can also be appreciated by one skilled in the art that the choice of material for the face of the bevel depression (42) to a self lubricating semi-hard material further facilitates the self aligning features of the design. The base of the compressing head (36) can be shaped to provide a gripping means to provide ease of handling, removal and insertion. A ribbed form of the component base is shown, with three ridges along the cylindrical base of the compressing head's (36) cylindrical body to facilitate gripping.

Figure 9:
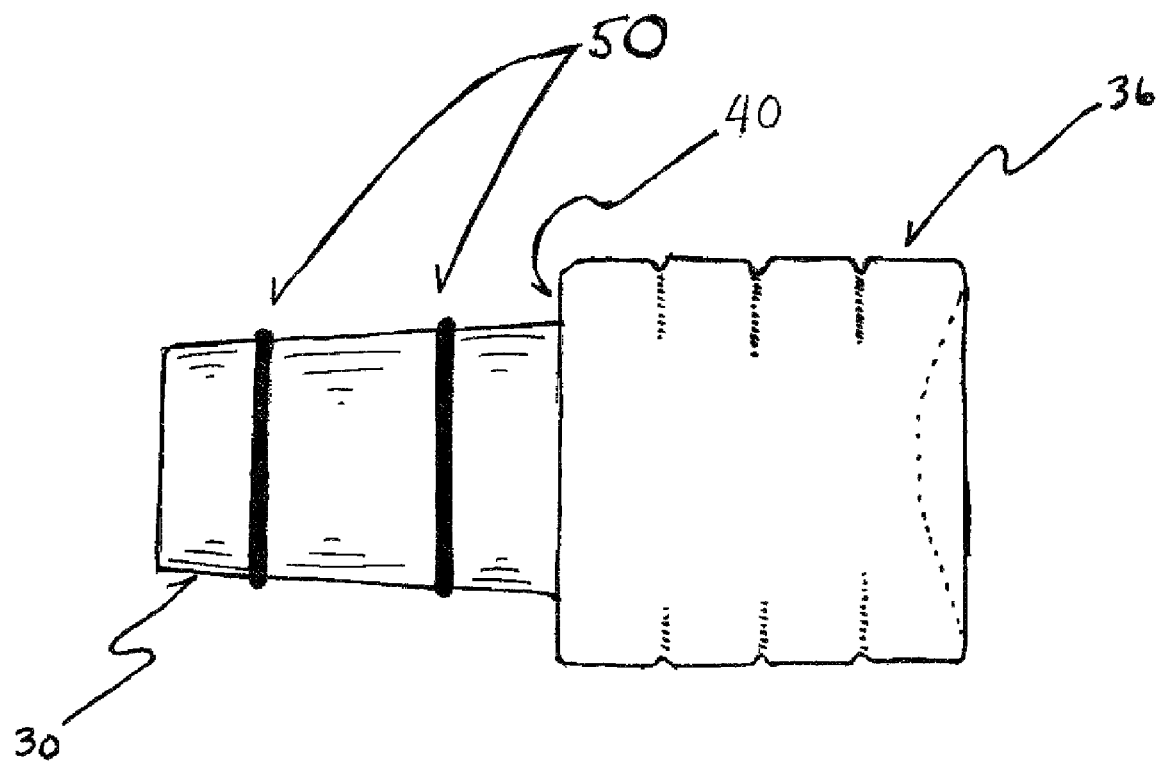
FIG. 9 is a side view of a preferred embodiment of a coupling end, lined with a pair of o-rings.

FIG. 9 is a view of a preferred embodiment of a coupling end (30) lined with a pair of elastic o-rings (50). It can be appreciated by one skilled in the art that the number of the plurality of o-rings can be a function of the holding power, versus ease of extraction required by the craftsman. The coupling end (30) shown in FIG. 9 is attached to a base of the compressing head (36) but an identical coupling end and o-ring configuration can be applied to the mounting head (28). The o-rings (50) are fitted over insertion grooves along a cylindrical coupling end (30), spaced to optimize the fitting of the compressing head (14) into a lathe. The outer diameter of the o-rings (50) exceed the outer diameter of the coupling end (30), providing a semi-adjustable fitting upon the headstock (17) or tailstock (19) of the lathe. The slight grade of the Morse Taper of the coupling end (20) or (30), combined with the o-rings, allow the pen assembly tool to attach to a variety of headstock and tailstock openings. By example, in FIG. 11 a compressing head (14) is inserted into the opening of a tailstock (19) whereby the o-rings (50) fit the compressing head (14) firmly into the tailstock opening, and create a small gap (52) between the outermost diameter of the coupling end and the inner wall of the tailstock opening.

Figure 10:
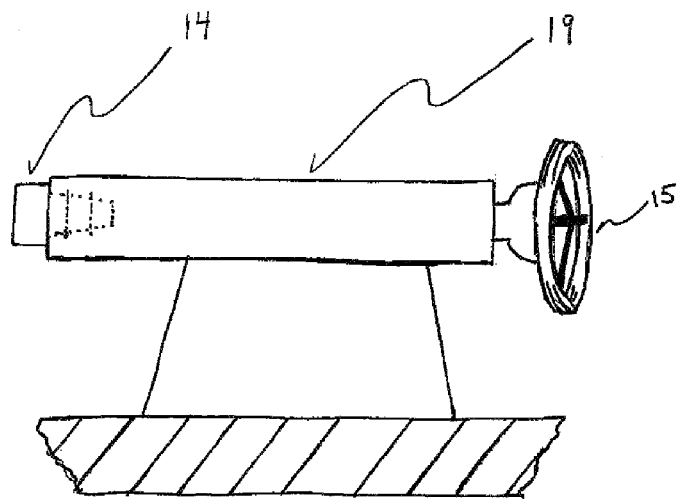
FIG. 10 is a side schematic view of an embodiment of a compressing head of the assembly tool as inserted flush against the tailstock receiver of a lathe.
Figure 11:
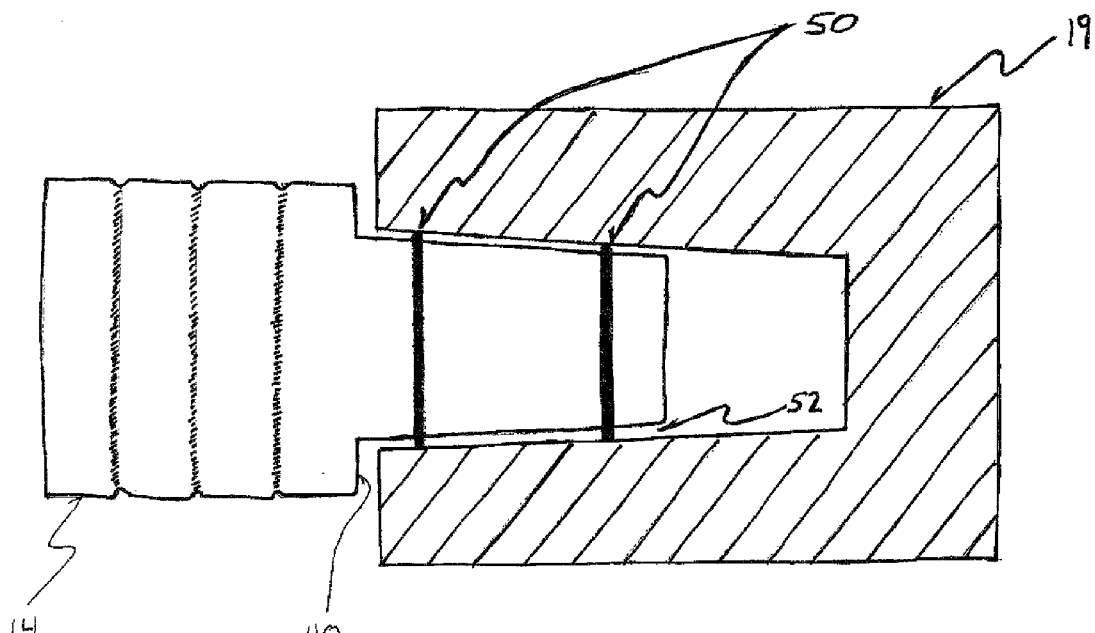
FIG. 11 shows a side view preferred embodiment of a compressing head inserted into the tailstock receiver (shown in cross section) of a lathe.

Both components of the functional handle assembly tool (10) fit flush against the tailstock (19) or headstock (17) of a lathe, when the preferred embodiments of the compressing (14) and mounting (12) heads are applied, because of the shoulder (40). By example, FIG. 10 is a view of a preferred embodiment of a compressing head (14) component of the pen assembly tool (10) inserted flush into the tailstock (19) of a lathe. The tailstock hand-wheel (15) can be turned by the wood turner to press-fit mating parts of a pen kit assembly. In FIG. 11, the outermost diameter of the compressing head (14) exceeds the diameter of the tailstock opening, whereby the shoulder (40) of the compressing head (14) fits flush against the tailstock (19). The fitting of the shoulder (40) of the compressing head (14) against the tailstock (19) acts to fully align the assembly tool (10) with the tailstock which further provides a self centering reference and can be appreciated by one skilled in the art.

EXAMPLE OF ASSEMBLY

Figure 12A:
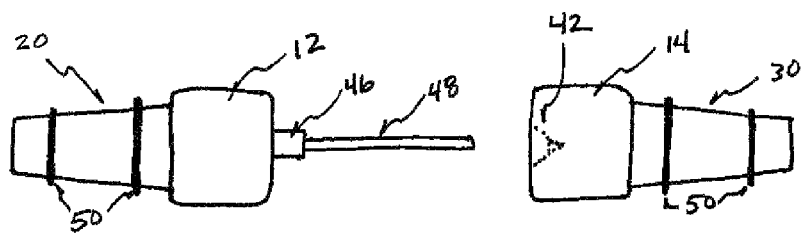
FIG. 12a shows a side view several components of an embodiment of the pen assembly tool, headstock and tailstock receivers not shown.
Figure 12B:
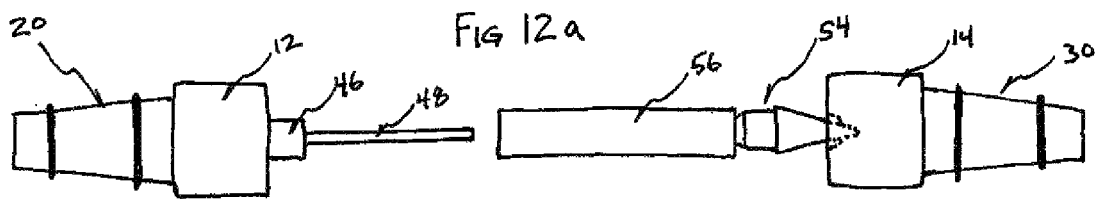
FIG. 12b shows the placement of a pen nib and pen barrel on the pen assembly tool, prior to press-fitting.
Figure 12C:
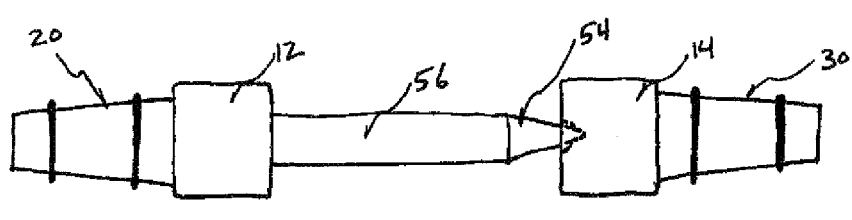
FIG. 12c shows a press-fitted pen nib and pen barrel using the pen assembly tool.

FIG. 12 shows typical steps for assembly. In this case, FIG. 12a shows a pen assembly tool (10), whereby the alignment guide and bushing (16) is inserted into the mounting head (12), exposing the transmission guide and the bushing (46), which acts as a barrel guide for a pen barrel (56). In FIG. 12b a pen nib (54) is placed into the bevel depression (42) of the compressing head (14) and a pen barrel (56) is slipped over the bushing (46). The compressing head (14) with the pen nib (54) is advanced axially toward the mounting head (12) and pen barrel (56) until the pen nib (54) is firmly press-fitted into the pen barrel (56). FIG. 12c shows a press-fitted pen nib (54) and pen barrel (56). Like steps can be repeated for press-fitting other mating parts of a functional handle kit assembly.

The functional handle assembly tool can be created at different scales to accommodate variations in coupling end sizes, or headstock or tailstock openings. Although the assembly tool herein described uses the example of the press-fitting of mating parts for a pen kit, the skilled observer may note that it may adapted for press-fitting a wide variety of handheld objects typically created on a lathe, such as pencils, laser pointers, basting brushes, dusters, tools, letter openers, bottle openers, key rings, vials and the like.

Since other modifications and changes varied to fit particular operating requirements and environments will be apparent to those skilled in the art, the invention is not considered limited to examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for making a small functional handle comprising:
   a handle portion comprising a substantially hollow tube for receiving mating parts contained in an assembly kit;
   a press fitting apparatus for joining said mating parts with said handle portion;
   said press fitting apparatus having a first receiving means and a second receiving means being substantially opposed to one another;
   inserting into said first receiving means a mounting head comprising a substantially cylindrical base with a first face having a conical section extending a predetermined length from said first face to a second face being substantially parallel to said first face, and a transmission guide, comprised of a substantially rod like structure, extending orthogonally from said second face of said base, said conical section being inserted into said first receiving means;
   inserting into second receiving means a compressing head comprising a substantially cylindrical base with a coupling face having a conical section in the form of a taper extending from said coupling face, and an engaging face substantially parallel to said coupling face and being substantially orthogonal to the center axis of said cylindrical base, said conical section being inserted into said second receiving means;
   arranging said handle portion and said mating parts in an organized way between said first and second receiving means that when said first and second receiving means are moved axially toward one another, said mating parts are fixedly joined together.

2. The method of claim 1 wherein said press fitting apparatus is a lathe having a headstock and a tail stock.

3. The method of claim 2 wherein a shoulder is found between said cylindrical base and said conical section.

4. The method of claim 3 wherein said shoulder abuts to a headstock or tailstock of a lathe.

5. A tool for press fitting the mating parts of functional handle kit assembly using a press-fitting apparatus comprising:
- a pair of compressing heads of suitable material, each head comprising a substantially cylindrical member with a compressing face wherein;
- at least one of said compressing faces having an inverse conical indentation having an apex along substantially the same axis of travel of the press-fitting apparatus,
- means for detachably mounting said compressing heads with said press-fitting apparatus.

6. The tool in accordance with claim 5, wherein at least one of said compressing faces is replaced by a mounting face comprising,
- a drill hole substantially in the center of said mounting face along substantially the same axis of travel of said press-fitting apparatus;
- a rigid alignment rod of a predetermined length comprising a guide segment connected to an insertion segment;
- said guide segment having a predetermined diameter to accompany a tubular component;
- the diameter of said drill hole being suitably matched with the diameter of said insertion segment whereby said insertion segment may be inserted into said drill hole of said mounting face.

7. The tool in accordance with claim 6, wherein said suitable material is self lubricating.

8. The tool in accordance with claim 7, wherein said suitable material is an acetyl based plastic.

9. A tool for press-fitting components of a small handle or instrument, such as those typically found in a pen assembly kit, comprising:
- a compressing head having a first substantially cylindrical solid shape of predetermined length, said first cylindrical solid shape having a first coupling end and a compressing segment;
- said first coupling end having a first coupling face perpendicular to the axis of said first cylindrical solid shape;
- said compressing segment having a compressing face perpendicular to the axis of said first cylindrical solid shape and substantially parallel to said first coupling face whereby said first coupling end may be inserted into a press-fitting apparatus;
- said compressing segment further comprising an inverse conical indentation orthogonal to said compressing face, and the apex of said inverse conical indentation along the substantially same axis of said first cylindrical solid shape, whereby at least one said compressing head may be used to press-fit components of a small handle or instrument;
- said first coupling end forming a first conical taper along substantially the same axis of said first cylindrical solid shape from said first coupling face to said compressing segment;
- a first plurality of o-rings spaced apart by a predetermined length along said first coupling end;
- said first plurality of o-rings being substantially perpendicular to the axis of said first cylindrical solid shape;
- a mounting head, having a second substantially cylindrical solid shape of predetermined length, comprised of a suitable material, said second cylindrical solid shape having a second coupling end and a mounting segment;
- said second coupling end having a second coupling face perpendicular to the axis of said second cylindrical solid shape;
- said mounting segment having a mounting face perpendicular to the axis of said second cylindrical solid shape and substantially parallel to said second coupling face, whereby said second coupling end may be inserted into a press-fitting apparatus;
- said mounting segment having a drill hole substantially in the center of said mounting face along the substantially same axis of said second cylindrical solid shape;
- a rigid alignment rod of a predetermined length comprising a guide segment connected to an insertion segment;
- said guide segment having a predetermined diameter to accompany a tubular component, the diameter of said drill hole being slightly greater than the diameter of said insertion segment whereby said insertion segment of said alignment rod may be inserted orthogonally into said drill hole of said mounting face, along substantially the same axis of said second cylindrical solid shape;
- said second coupling end forming a second conical taper along the substantially same axis of said cylindrical solid shape from said second coupling face to said mounting segment;
- said second coupling end forming a second conical taper along substantially the same axis of said second cylindrical solid shape from said second coupling face to said mounting segment;
- a second plurality of o-rings spaced apart by a predetermined length along said second coupling end;
- said second plurality of o-rings being substantially perpendicular to the axis of said second cylindrical solid shape.

10. The tool of claim 9, wherein said press fitting apparatus is a lathe having a headstock and a tail stock.

11. The tool of claim 10, wherein said tool comprises a self lubricating material.

12. The method of claim 11 wherein said first conical taper forms a substantially squared shoulder at the inner base of said compressing segment.

13. The method of claim 11 wherein the second conical taper forms a substantially squared shoulder at the inner base of the mounting segment.

* * * * *